Nov. 1, 1 3,282,093
APPARATUS FOR MEASURING FLEXURE OF A ROTATING OBJECT
Filed April 25, 1963
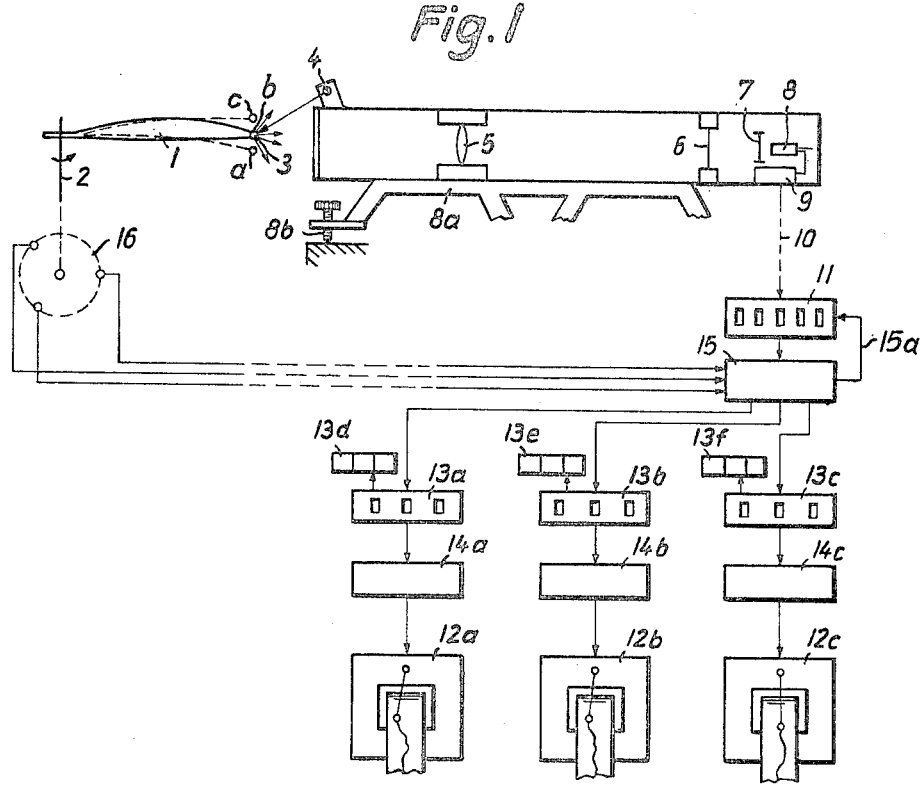
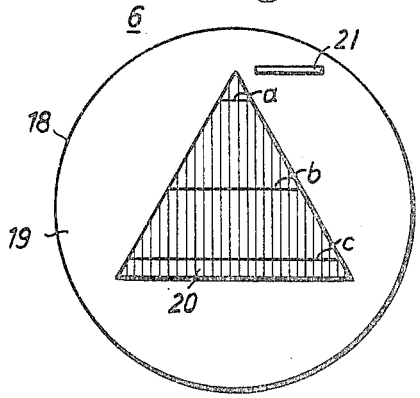
Inventor:
Hans Rehder
By: Spencer & Kaye
Attorneys United States Patent Office 3,282,093
Patented Nov. 1, 1966

3,282,093
APPARATUS FOR MEASURING FLEXURE OF A ROTATING OBJECT
Hans Rehder, Frankfurt am Main, Germany, assignor to Licentia Patent-Verwaltungs-G.m.b.H., Frankfurt am Main, Germany
Filed Apr. 25, 1963, Ser. No. 275,660
Claims priority, application Germany, Apr. 27, 1962, L 41,847
15 Claims. (Cl. 73—147)

The present invention relates to a measuring arrangement.

More particularly, the present invention relates to an arrangement for measuring the distance which a point on a rotating object is displaced, in a direction generally parallel to the axis about which the object rotates, during such rotation. Such an arrangement is particularly suited for measuring the extent to which the blades of a rotating propeller or helicopter rotor flex. It will be appreciated that such a measurement should be taken as accurately as possible without, however, it being necessary physically or mechanically to touch the rotating blades.

If the movement of an object, or the deflection of an object from its true path, is to be measured, and if the object itself is not readily accessible or physically, i.e., mechanically engageable, such measurement can be carried out by optic means. For example, the object whose movement is to be measured may be provided with an aperture that can be illuminated, which aperture can, by means of an optical system, be reproduced on a ground-glass or opaque disc, or on a photographic plate, so that the image of the aperture can be measured and analyzed. Such disc or photographic plate may be provided with a measuring raster of known size, or a photograph of the aperture can be developed together with the representation of such a raster. While this allows accurate measurements to be obtained without the object itself being touched, one drawback of, for example, the photographic method is that the result is not immediately available. Another drawback is that in the case of considerable irregular deflection, it is expensive to carry out the repeated measurements. On the other hand, if the measurement is to be read visually, the speed with which the eye can follow the readings is limited, to say nothing of errors introduced by the human operator.

Constant efforts have, therefore, been made to find ways to increase the speed with which the measurement is taken, to obtain an output value which changes in conformity with the movement of the object whose movement is being measured, and to eliminate human errors. One such system uses an aligned row of small photocells which serve as a scale, the arrangement being such that the object whose movement is to be measured is positioned between the photocells and a light source. The number of illuminated photocells are counted electronically, or an analog value is formed in a suitable manner. Such an arrangement is described in the Russian periodical "Metallurgy," No. 1, pages 23 to 25, Moscow 1960, in an article entitled "Automatic Measuring Apparatus for Rolled Stock" by Gutnikow and Tschuso. While the system there described can operate at any desired speed (limited only by the time lag inherent in the photoelectric cells), the resolution, i.e., the accuracy, is limited by the mechanical size of the cells. Each cell thus constitutes the smallest unit of measurement.

There exists another scanning system in which the position of objects which themselves are luminous or illuminated is determined by means of photocells forming part of an optical rotary mirror system. The difficulty with such a system is that the object whose movement is to be measured has to be within the measuring plane throughout several scanning periods of the mirror. If, however, the object being measured moves very rapidly, as is the case, for instance, with the tip of a helicopter rotor, the usual scanning frequency of a rotating mirror system, which is, for example, of the order of 300 c.p.s., is not high enough. Similar difficulties arise if the object is to be scanned by a television camera.

It is, therefore, an object of the present invention to provide a measuring system which overcomes the above drawbacks, that is to say, a measuring system which not only allows the measurement to be carried out within any desired short time interval, but which also yields the result of the measurement with practically any desired degree of accuracy in digital form, this being considered a substantial advantage in view of the fact that the result will generally be processed or recorded by electronic means, e.g., storage devices, indication by means of luminous figures, graphic recorders, punched cards or tapes, and the like.

With the above primary object in view, the present invention resides, basically, in an arrangement for measuring the distance which a point of a rotating object is displaced, in a direction generally parallel to the axis about which the object rotates, during such rotation, which arrangement comprises, basically, a reflection ball attached to a given point of the object, means for illuminating the ball to produce an image of the ball which moves along a line which is at right angles to the axis of rotation, a measuring raster arranged across this line and having raster lines which extend transversely thereto. The raster lines are of different lengths so that the number of raster lines cut by the moving image depends upon how far the point is displaced in the direction parallel to the axis of rotation. Means are provided which are responsive to the number of raster lines cut by the moving image for producing a digital output which is related to the number of raster lines swept and hence to the distance which the point is displaced in the above-mentioned parallel direction. Such an arrangement is particularly well adapted for use as a dynamic propeller or helicopter rotor testing arrangement that allows a measurement to be made of how much the blades of the rotating propeller or rotor are flexed.

Additional objects and advantages of the present invention will become apparent upon consideration of the following description when taken in conjunction with the accompanying drawings in which:

FIGURE 1 is a partly structural and partly schematic illustration of an arrangement according to the present invention.

FIGURE 2 shows a raster such as may be used in the system according to the instant invention.

Referring now to the drawing and to FIGURE 1 thereof in particular, the same shows a helicopter rotor blade 1 which may be one of three such blades of a rotor which is rotated about an axis 2. The object of the measuring system is to determine the distance which the tip of the blade moves vertically (as viewed in FIGURE 1) in a direction parallel to the axis of rotation 2, as a function of the rotational speed and pitch of the blade. The tip of the blade 1 carries a reflecting ball 3. Such ball may, for example, be a sphere of polished glass which has aluminum deposited thereon. The remainder of the surface of the blade is covered with a non-reflecting coating, such as a dull black lacquer. The ball 3 has a diameter of, for example, several millimeters and is carried by the blade at a point which lies on the pitch axis of the blade, i.e., the axis about which the blade rotates when its pitch is changed.

The measuring apparatus proper comprises an optical system, preferably one which is responsive to ultra-violet light. The optical system incorporates a very high pressure mercury vapor lamp 4, a lens (or lens system) 5 which passes ultra-violet light and which is so configured as to project an image onto a flat focussing plane, a measuring grid or raster 6 carried by a pane of quartz glass which itself passes ultra-violet light, an ultra-violet daylight filter 7, such as "Uviol," and a photomultiplier 8. The optical system is mounted on a traverse 8a in the manner of a telescope so that the ball 3 carried at the tip of the blade and illuminated by the ultra-violet lamp 4 causes a horizontal image line, i.e., a reproduction of the moving image, to be reproduced on the measuring grid. The traverse, which carries the optical system, is equipped with an adjustment screw 8b. Depending on the flexure of the blades and hence on the position of the rotating blade tips, a greater or smaller number of raster lines will be swept by the image line, so that there will be a greater or smaller number of electrical pulses appearing at the output of the multiplier. The pulses are applied, via an impedance transformer 9 and a line 10 whose length is non-critical, to a counter 11. The measuring raster is so arranged that, for example, each millimeter of vertical movement of the blade tip will result in one or ten pulses for the counter. In order to obtain an independent reading for each blade, and so that these readings may be taken for all blades during the rotation of the rotor, the output of the counter 11 is connected to a gate circuit 15 which is controlled by a synchronous timer 16. The latter, shown in FIGURE 1 as being set up for a three-bladed rotor so that the triggering positions which are connected to the gate circuit 15 are angularly displaced by 120°, causes the gate circuit 15 to transfer the particular values appearing at the output of the counter 11 to the respective individual counters 13a, 13b, 13c, depending upon the position of the rotor so that each of the three individual counters 13a, 13b, 13c, corresponds to one of the three rotor blades. After each such transfer, the counter 11 is reset to zero by the gate circuit 15, as indicated schematically by resetting line 15a. The three counters 13a, 13b, 13c, have visual number indicators 13d, 13e, 13f, respectively, associated therewith so that a digital indication of the measuring result may be obtained. In practice, the indicators are so connected that their readings are not periodically reset, but remain visible and undergo a change only if the succeeding measurement changes.

The arrangement also includes three digital-to-analog converters 14a, 14b, 14c, connected to the outputs of the counters 13a, 13b, 13c, respectively, which converters have their outputs, in turn, connected to the inputs of three graphic recorders 12a, 12b, 12c, respectively.

FIGURE 2 shows a measuring raster which may be used in a system according to the present invention. The same comprises a housing 18 supporting a diaphragm 19 which carries a triangular line raster 20, there being, for example, 300 raster lines distributed over 30 centimeters. Also shown is a setting opening 21 for zeroing in the line raster.

As is apparent from FIGURE 2, the raster lines extend transversely, and preferably at substantially right angles, to the image line produced by the ball carried by the blade tip which moves past the optical system. The level of the image line with respect to the raster lines will depend on how much the blade flexes during rotation of the rotor and this, in turn, will determine the number of raster lines that are swept by the image line. FIGURE 1 shows the reflection ball as occupying three positions a, b, and c, which may, for example, be the positions occupied by the blade tips of a three-bladed rotor undergoing the test. The blade carrying the ball at position a will produce the image line a shown in FIGURE 2, the blade carrying the ball at point b (i.e., the blade 1 shown in solid lines in FIGURE 1) will produce the image line b of FIGURE 2, while the third blade will position its ball at c, thereby producing the image line c of FIGURE 2. The image lines a, b, c, are shown as sweeping three, fifteen, and twenty-five raster lines, respectively, so that appropriate digital values will appear at the indicators 13d, 13e, and 13f.

It will be understood that the above description of the present invention is susceptible to various modifications, changes, and adaptations, and the same are intended to be comprehended within the meaning and range of equivalents of the appended claims.

What is claimed is:

1. For use with a rotating object, an arrangement for measuring the distance which a point on the object is displaced, in a direction generally parallel to the axis about which the object rotates, during such rotation, said arrangement comprising, in combination:
   (a) a reflection ball attached to said point of the object;
   (b) means for illuminating said ball to produce an image of said ball which image moves along a line which is at right angles to said axis of rotation;
   (c) a measuring raster arranged across said line and having raster lines extending transversely thereto, said raster lines being of different lengths so that the number of raster lines cut by the moving image depends upon how far said point is displaced in said direction parallel to said axis of rotation; and
   (d) means responsive to the image for producing electrical pulses in accordance with the number of raster lines cut by the moving image and hence to the distance which said point is displaced in said direction parallel to said axis of rotation.

2. An arrangement as defined in claim 4 wherein said raster is generally triangular.

3. An arrangement as defined in claim 4 wherein said illuminating means comprise a source of ultra-violet light.

4. An arrangement as defined in claim 1 wherein said means (d) comprise a photosensitive device arranged on the side of said raster which is opposite the side on which the ball is positioned in consequence of which a light pulse is received by said photosensitive device each time the light coming from said ball intersects a line of said raster, a counter connected to said photosensitive device for counting the number of pulses received thereby, and means for indicating the output of said counter.

5. An arrangement as defined in claim 4 wherein there are a plurality of points on said object angularly distributed about the axis of rotation thereof, wherein there is a reflection ball at each of said points, wherein said means for indicating the output of said counter comprise a plurality of indicators each correlated with one of said points on said object wherein means are provided for rotating the object, and wherein means are provided which are associated with the last-mentioned means for connecting each respective indicator with said counter when the particular reflection ball with which such indicator is correlated produces an image that sweeps said raster.

6. An arrangement as defined in claim 5 wherein said connecting means comprise a rotary timer coacting with the object and producing an output signal when the ball at each particular point produces an image which sweeps said raster, and a gate connected to receive the output signals and interposed between said counter and said indicators for applying the result appearing at the counter to the proper indicator.

7. An arrangement as defined in claim 6 wherein said gate is connected to said counter for resetting the same after a result has been transferred to one of the indicators.

8. An arrangement as defined in claim 6 wherein each of said indicators comprises an individual counter for receiving the result from said counter connected to said photosensitive device, and an indicating device for indicating the contents in the respective individual counter.

9. An arrangement as defined in claim 8, further comprising a plurality of digital-to-analog converters each connected to a respective one of said individual counters for producing an analog value representing the result stored in such individual counter, and a plurality of recording devices each connected to a respective one of said converters.

10. An arrangement as defined in claim 1 wherein the object is a multiple-bladed element and wherein said ball is located at the tip of one of the blades.

11. An arrangement as defined in claim 10 wherein the element is of the variable-pitch type and wherein said ball is located on the pitch axis of the blade.

12. A dynamic propeller or rotor testing arrangement for measuring how much a blade of the rotating propeller or rotor is flexed during such rotation, said arrangement comprising, in combination:
   (a) a reflection ball attached to the tip of the blade;
   (b) means for illuminating said ball to produce an image of said ball which image moves along a line which is at right angles to said axis of rotation;
   (c) a measuring raster arranged across said line and having raster lines extending substantially at right angles to the image line which sweeps said raster and said raster lines being of different lengths so that the number of raster lines cut by the moving image depends upon how much the blade flexes during rotation and therefore how far the tip of the blade is displaced in said direction parallel to said axis of rotation; and
   (d) means responsive to the image for producing electrical pulses in accordance with the number of raster lines cut by the moving image and hence to the flexing of the blade.

13. An arrangement as defined in claim 12 wherein said means (d) comprise:
   (1) a photosensitive device arranged on the side of said raster which is opposite the side on which the ball is positioned in consequence of which a light pulse is received by said photosensitive device each time the light coming from said ball intersects a line of said raster;
   (2) a counter connected to said photosensitive device for counting the number of pulses produced thereby; and
   (3) means for indicating the output of said counter.

14. An arrangement as defined in claim 13 for measuring how much each blade of the rotating propeller or rotor is flexed, said arrangement comprising a plurality of reflection balls each attached to the tip of a respective blade, said output indicating means comprising a plurality of indicators each corresponding to one respective blade, a rotary timer coordinated with the propeller or rotor for producing an output signal when the ball at each particular tip produces an image line which sweeps said raster, and a gate connected to receive the output signals and interposed between said counter and said indicators for applying the result appearing at the counter to the proper indicator.

15. An arrangement as defined in claim 13 wherein said raster is triangular.

References Cited by the Examiner

UNITED STATES PATENTS

| | | | |
|---|---|---|---|
| 1,664,210 | 3/1928 | Hall. | |
| 2,455,053 | 11/1948 | Flint | 73—147 X |
| 2,960,908 | 11/1960 | Willits et al. | 73—147 |
| 3,105,381 | 10/1963 | Collette | 73—71.3 X |
| 3,194,966 | 7/1965 | Hulett | 88—14 X |

FOREIGN PATENTS 1,086,997  8/1954  France.

RICHARD C. QUEISSER, *Primary Examiner.*

J. P. BEAUCHAMP, *Assistant Examiner.*